United States Patent [19]

Troyk et al.

[11] Patent Number: 5,198,807
[45] Date of Patent: Mar. 30, 1993

[54] METHOD AND APPARATUS FOR PRODUCING A SUBCARRIER SIGNAL FOR TRANSMISSION BY AN INDUCTIVELY COUPLED TRANSPONDER

[75] Inventors: Philip R. Troyk, Morton Grove; Glenn A. DeMichele, Chicago, both of Ill.

[73] Assignee: Trovan Limited, United Kingdom

[21] Appl. No.: 711,358

[22] Filed: Jun. 5, 1991

Related U.S. Application Data

[63] Continuation of Ser. No. 420,798, Oct. 12, 1989, abandoned, which is a continuation-in-part of Ser. No. 358,310, May 26, 1989, Pat. No. 5,012,236.

[51] Int. Cl.$^5$ ............................................. H04B 7/00
[52] U.S. Cl. ................................................. 340/825.54
[58] Field of Search ....................... 340/825.54, 825.57, 340/825.58, 825.69, 825.70, 825.72, 825.73; 455/41, 43; 342/42, 44, 51

[56] References Cited

U.S. PATENT DOCUMENTS

| | | |
|---|---|---|
| 3,859,624 | 1/1975 | Kriofsky et al. |
| 3,898,619 | 8/1975 | Carsten et al. ............... 340/825.54 |
| 3,964,024 | 6/1976 | Hutton et al. |
| 4,517,563 | 5/1985 | Diamant ........................ 340/825.54 |
| 4,550,444 | 10/1985 | Uebel ............................. 340/825.54 |
| 4,569,060 | 2/1986 | Esterling et al. ............. 340/825.58 |
| 4,691,202 | 9/1987 | Denne et al. ................. 340/825.54 |
| 4,714,925 | 12/1987 | Bartlett ......................... 340/825.54 |
| 4,724,427 | 2/1988 | Carroll .......................... 340/825.54 |
| 4,857,893 | 8/1989 | Carroll .......................... 340/825.54 |
| 4,864,292 | 9/1989 | Nieuwkoop .................. 340/825.54 |
| 4,868,915 | 9/1989 | Anderson, III et al. ..... 340/825.69 |
| 4,893,118 | 1/1990 | Lewiner et al. .............. 340/825.54 |
| 5,095,309 | 3/1992 | Troyk et al. .................. 340/825.54 |

OTHER PUBLICATIONS

Destron/IDI, Inc.; Mini-Portable Reader HS 5105L Series, Standard & Extended Memory (Apr. 1991).
Texas Instruments; Registration and Identification System (TIRIS) Preliminary User Specification (Nov. 29, 1990).

Primary Examiner—Donald J. Yusko
Assistant Examiner—Dervis Magistre
Attorney, Agent, or Firm—Rosenblum, Parish & Isaacs

[57] ABSTRACT

A transponder system including a transponder and an interrogator having a transmission coil for producing a high-intensity electromagnetic field for inductively powering the transponder and two receiver coils for receiving a low-intensity electromagnetic field reradiated by the transponder. The transmission coil includes one or more conductive windings circumscribing a substantially polygonal volume of space. The receiver coils are diametrically disposed opposite one another within the volume space of the transmitter and are electrically connected to each other in a differential circuit relationship, the output of which is at a minimum when the two receiver coils receive approximately equal quantities of energy and is at a maximum when one of the receiver coils receives more electromagnetic energy from the transponder than the other receiver coil. The transponder uses a coil to derive both a power source and a clock pulse from the high-intensity field for powering and driving an identification circuit. The frequency of the clock pulse is then divided by 8 to drive the memory array and logic network of the identification circuit so that it clocks out a new data bit every 16 cycles of the carrier frequency. The output of the memory array is then used to phase modulate a subcarrier, which is at ½ the frequency of the carrier frequency. The subcarrier frequency of ½ the carrier frequency is chosen to maximize the amplitude of the transmitted subcarrier. The transponder also includes a double pulse lockout circuit which prevents rapid consecutive shortouts of the transponder's coil.

12 Claims, 9 Drawing Sheets

METHOD AND APPARATUS FOR PRODUCING A SUBCARRIER SIGNAL FOR TRANSMISSION BY AN INDUCTIVELY COUPLED TRANSPONDER

This application is a continuation of application Ser. No. 07/420,798 filed Oct. 12, 1989 now abandoned and entitled "Method and Apparatus for Producing a Subcarrier Signal for Transmission by an Inductively Coupled Transformer" (now abandoned), which is a continuation-in-part of application Ser. No. 07/358,310 filed May 26, 1989, now U.S. Pat. No. 5,012,236, entitled "Electromagnetic Energy Transmission and Detection Apparatus", assigned to the assignee of the present invention.

This application is also related to two other U.S. patents; U.S. Pat. No. 5,084,699, entitled "Impedance Matching Coil Assembly for an Inductively Coupled Transponder", and U.S. Pat. No. 5,095,309, entitled "Method and Apparatus for Modulation and Detecting a Subcarrier Signal for an Inductively Coupled Transponder", both assigned to the assignee of the present invention.

BACKGROUND OF THE INVENTION

1. Field of the Invention

The present invention relates generally to inductively coupled electromagnetic energy field transmission and detection systems, such as a transponder in combination with an interrogation system, and more particularly to a method and apparatus for increasing the strength and detectability of an inductively coupled transponder signal.

2. Brief Discussion of the Prior Art

Many objects, such as houses, pets and cars, require some means of identification. Many prior art methods of identification have required visual interrogation of the identifying medium to extract the identification data, such as reading numbers on houses, license plates on cars, and collar tags or brands on animals. Electronic identification tags have also been created, which can be associated with the object and electronically communicated with at a distance, such as the electronic sensing and actuator systems shown in U.S. Pat. Nos. 3,732,465 and 3,752,960.

The systems described in those patents are comprised of an active element, having a single transmitting and receiving coil, which operates by transmitting an electromagnetic field within the proximity of a passive electrical circuit, thereby inductively coupling the coil with the passive circuit. The passive circuit operates to create a characteristic change in the transmitted electromagnetic field that can be detected by the electronics associated with the receiving coil and used to trigger some mode of operation for the system. Although such systems remove some of the restrictions associated with the previously described visual identification systems, such systems are really nothing more than electronic keys, and actually convey less information to the active element than does a visually inspectable tag.

More sophisticated electronic systems use an exciter coil to transmit a high intensity electromagnetic energy field in the proximity of an electronic tag or transponder. The transponder is energized by the electrical energy inductively transferred by the transmitted magnetic field and is made operative to output a modulated identification signal which can be detected by an inductively coupled receiving coil proximately located at the exciter coil. The passive tag or transponder element of many of these devices, such as that described in U.S. Pat. No. 4,262,632, includes a coil which receives electromagnetic energy from a transmitted interrogation signal and retransmits an identification signal developed by the identification circuitry associated with the transponder. Electrical control circuitry within the transponder converts and rectifies the energy received from the transponder coil and develops a dc power source for use in operating the transponder's identification circuitry.

Transponders which utilize a sufficiently large capacitor or resident power source, such as a battery, are able to transmit identification signals over fairly large distances, from a few yards to thousands of feet. However, in certain applications, such as identifying small animals, the size of the sealed packaging required to house the battery or capacitor may be too large for the intended use.

A great amount of effort has been expended to develop a truly passive transponder, which will do more than simply operate as an electronic key. A transponder which can be safely implanted within livestock and interrogated from a practical distance would help to reduce problems associated with certain regulations being implemented by the European Economic Community that will require all livestock to be separately identified.

One effort to create such a transponder resulted in the syringe-implantable transponder of European Patent No. 258,415. This patent and other related patented systems, such as U.S. Pat. Nos. 3,859,624, 3,689,885, 4,532,932 and 4,361,153, disclose passive elements which operate in real time and therefore do not require any type of significant energy storage means. The transmitting and receiving units of these systems, which are often referred to as interrogators or readers, typically include either a single, dual or triple coil arrangement, which is used to both transmit a high intensity electromagnetic field in proximity of the identification unit and receive an identification signal retransmitted by the transponder in proximity of the reader coils of the interrogator.

The detection range of such systems is typically very restricted since the strength of the electromagnetic field produced by the transponder drops by $1/d^5$, at the receiver, where d is the distance between the receiving coil and the transponder coil, as the interrogator is moved away from the transponder. In fact, it has been calculated that at distances of 6 to 8 inches the strength of the magnetic field carrying the identification signal from the transponder, in devices similar to that described in the European Patent No. 258,415, is only an estimated one billionth the strength of the magnetic field carrying the interrogation signal to the transponder. Hence, the interrogator must normally be placed in very close proximity to the transponder in order for the identification signal to be detected. This limitation, of course, greatly restricts the utility of such devices, since not all objects may be so closely approached in order to be read.

If a transponder system is to be expected to maintain a greater reading distance, a number of different characteristics of the system must be considered. To increase or maintain a certain reading distance, the interrogator's ability to detect the identification signal transmitted by the transponder must be enhanced. A limitation restricting the reading distance of the transponder system is associated with the strength of the signal transmitted from the transponder to the reader. Hence, it is not only important to assure that an efficient inductive couple exists between the interrogator and the transponder, so that the transponder receives as much energy for operation as is possible, but it is also important to maximize the strength of the signal transmitted from the transponder to the interrogator.

Prior art transponder systems not only generally fail to provide for an efficient coupling between the interrogator and the transponder, but also fail to maximize the strength of the transponder signal. One reason prior art systems do not maximize the transponder signal is because the physical and electrical configurations of the interrogator's transmitting and receiving coils require that the frequency of the transponder signal be significantly different from that of the interrogator signal, thereby limiting the frequency and amplitude of the subcarrier signal. For example, U.S. Pat. No. 3,689,885 states that "[i]t has been found that by having the carrier time-base signal at a comparatively high frequency such as, for example $f_z=450$ KHz, and the electromagnetic power field at a lower frequency, for example, $f_1=50$ KHz, interference between the electromagnetic coded information field and the electromagnetic power field is minimized." Col. 7, lines 11–17.

The efficiency and speed of many of the prior art transponder systems is also restricted by the type of modulation technique used to modulate the subcarrier. Many prior art systems use frequency-shift-keyed modulation for modulating the transponder's subcarrier, which generally requires fairly complex circuitry and which severely limits the data transfer rate of the subcarrier. U.S. Pat. No. 3,964,024 discloses a transponder system which utilizes phase-shift modulation for modulating the subcarrier, a technique which reduces the complexity of the circuitry required in the transponder, generally enhances the efficiency of the band-width, and increases the data rate of the subcarrier. However, this modulation technique requires that the transponder be equipped with two separately located coils, one for receiving power from the interrogator and one for transmitting the identification signal. In addition, since the data bit shifts high or low each time a phase change occurs, this technique does not anticipate a change in the orientation of the transponder resulting in a phase shift of the incoming signal or the transmitted signals.

Hence, a need has arisen for a transmission and detection system which can simultaneously transmit a high energy magnetic field, sufficient to power the transponder unit, and detect a localized retransmitted magnetic field at greater distances and with greater reliability.

SUMMARY OF THE PRESENT INVENTION

It is therefore an object of the present invention to provide a novel electromagnetic field transmission and detection system which can simultaneously transmit a high intensity magnetic field and detect a localized low intensity magnetic field.

Another object of the present invention is to provide a novel electromagnetic field transmission and detection system which can accurately detect a localized low-intensity magnetic field in the presence of a high-intensity magnetic field, or other uniform electromagnetic interference or noise.

A further object of the present invention is to provide a novel electromagnetic field transmission and detection system which is capable of accurately detecting very low-energy magnetic fields within a range of at least 6–8 inches from the low-energy field transmission source.

A further object of the present invention is to provide a method and apparatus for modulating the subcarrier signal transmitted by the transponder so as to maximize the amplitude of that signal.

A still further object of the present invention is to provide a method and apparatus for modulating the subcarrier signal transmitted by a moving transponder so to accurately detect that subcarrier with the interrogator.

Briefly, a preferred embodiment of the present invention comprises a transponder system including a transponder and an interrogator having a transmission coil for producing a high-intensity electromagnetic field for inductively powering the transponder and two receiver coils for receiving a low-intensity electromagnetic field reradiated by the transponder. The transmission coil includes one or more conductive windings circumscribing a substantially polygonal volume of space. The receiver coils are diametrically disposed opposite one another within the volume space of the transmitter and are electrically connected to each other in a differential circuit relationship, the output of which is at a minimum when the two receiver coils receive approximately equal quantities of energy and is at a maximum when one of the receiver coils receives more electromagnetic energy from the transponder than the other receiver coil. The transponder uses a coil to derive both a power source and a clock pulse from the high-intensity field for powering and driving an identification circuit. The transponder's identification circuit then operates to divide the frequency of the clock pulse by 8 to drive its memory array and logic network so that a new data bit is clocked out every 16 cycles of the carrier frequency. The memory array is constructed to produce a new data bit on the rising edges of its input clock pulse. This results in an effective divide by two stage internal to the memory array, which results in the output of a new data bit every 16 cycles of the carrier. The same clock pulse is then used to generate the subcarrier which is at ½ the frequency of the carrier. The choice of ½ the carrier frequency as the subcarrier frequency maximizes the amplitude of the transmitted subcarrier. This subcarrier is then phase modulated by the output of a logic network so that one bit is encoded every 8 cycles of the subcarrier. This corresponds to one bit every 16 cycles of the carrier. The transponder also includes a double pulse lockout circuit which prevents rapid consecutive short-outs of the transponder's coil.

These and other objects of the present invention will no doubt become apparent to those skilled in the art after having read the following detailed disclosure of a preferred embodiment which is illustrated in the several figures of the drawing.

DESCRIPTION OF THE PREFERRED EMBODIMENT

Figure 1:
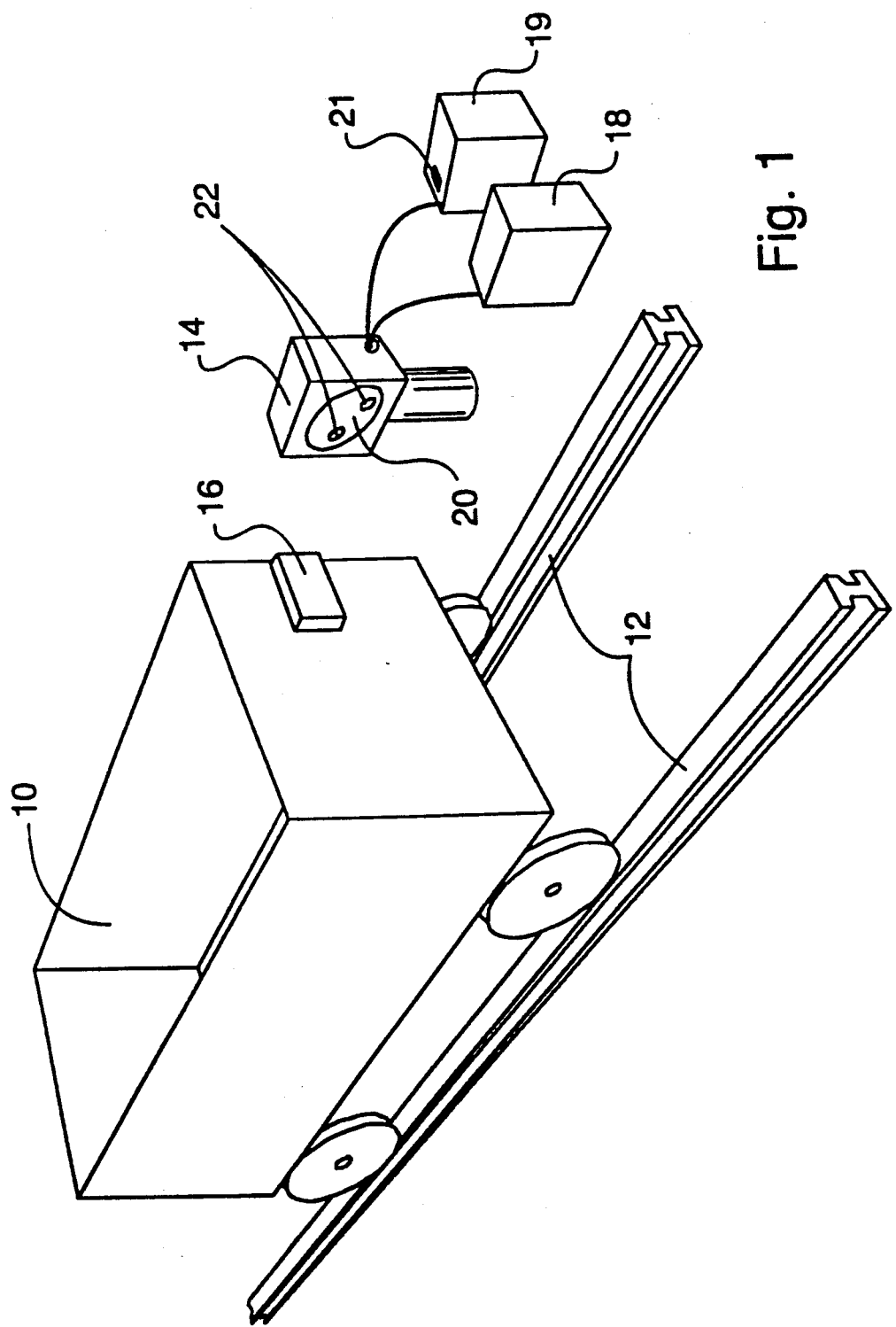
FIG. 1 is a partially-broken, perspective view of an application of an electromagnetic transmission and detection apparatus in accordance with the preferred embodiment of the present invention.

FIG. 1 illustrates a box car 10 travelling along rail lines 12 so as to pass along the front side of an interrogator or reader 14. Attached to the front of the box car is an identification box 16, which contains a transponder device in accordance with the preferred embodiment of the present invention, which will be further described with subsequent reference to FIGS. 5 through 9.

This identification device is positioned so as to pass within close proximity of the reader 14, which contains a transmitter coil 20 for transmitting a high-intensity electromagnetic field to the identification box and two receiver coils 32 and 34 for receiving the low-intensity electromagnetic field retransmitted by the transmitter of the identification box 16. A generator 18 supplies power to the transmitter coil to produce the high intensity electromagnetic field. A display and storage device 19 receives the output of reader 14 for storage and display of the content of the identification signal contained therein at display 21.

It should be noted that although the reader 14 is shown in communication with a passive identification device for purposes of the present invention, the electromagnetic transmission and detection apparatus of the present invention could be utilized in any of a number of applications where it is necessary to accurately detect a low-intensity electromagnetic field in the presence of uniform high-intensity electromagnetic fields.

The operation of the reader 14 may be better illustrated with reference now to FIG. 2, which illustrates transmitter coil 20 and the two differential receiver coils 32 and 34 of the preferred embodiment of the present invention. The number of windings utilized to create these coils, as well as the shape of the coils, can vary significantly. In general, the coils are substantially polygonal in shape, wherein a polygon is defined to mean a figure having many sides and a circle is assumed to be comprised of numerous straight lines rather than a true circle. Hence, the windings of the coils circumscribe a substantially polygonal volume of space, and the large outer transmitter coil 20 of the reader is generally comprised of about 20 turns of copper wire 24 wound in a polygonal manner so as to create a coil having a diameter, or polygonal diameter, of about 5 to 6 inches.

In all embodiments, the transmitter coil 20 and differential receiver coils 32 and 34 are ordinarily affixed to a suitable nonconductive support structure so as to be positionable as shown in FIG. 1. Support surfaces, such as the type required to support the coils of the present invention, are well known in the art, i.e., hand-held pistol-shaped scanner structures and wand-like antennas or scanner structures, and can be constructed so as to support the coils in any of a large number of different configurations. As will be noted below, many of the alternative embodiments of the present invention will require a support structure constructed in a manner different than that depicted in FIG. 1. In this regard, it is only important to note that the support should be constructed from such a material and in such a manner so as to not significantly interfere with the passage of electromagnetic energy to or from the coils.

When sufficient power is supplied to the transmitter coil 20, such that there is more electrical energy present in the coil than can be dissipated by the resistance of the coil, substantially toroidal-shaped electromagnetic energy fields, such as the flux fields 26 and 28, will be produced. Although the electromagnetic flux fields 26 and 28 are three-dimensional in nature, circumscribe the polygonal volume of the transmitter coil, and are not bounded within the defined limits depicted in FIG. 2, these electromagnetic flux fields will be illustrated by dashed lines 26 and 28 for the sake of simplicity. It should also be noted that the basic shape of the electromagnetic flux fields will be varied depending on the positioning of the differential receiver coils 32 and 34 with respect to the transmitter coil 20, as further described below.

When a passive identification device, such as the transponder assembly 30 of the identification box 16 is within the transmission and power range of the transmitter coil 20, some of the energy contained within the transmission fields will be transferred to the transponder assembly 30 through inductive coupling. The voltage extracted by the transponder's receiving coil (not shown in FIG. 2, but shown in FIG. 5) from the transmission field can then be used to power the electronic identification circuitry of the transponder, and in turn cause a modulated identification signal (in the form of current) to flow back through the coil of the transponder. Since the quantity of energy created by means of the inductive couple is small, and a certain quantity of that energy is utilized to operate the electronic circuitry of the transponder, the transponder coil is only capable of retransmitting a very low-intensity electromagnetic field of a highly localized nature.

Figure 3:
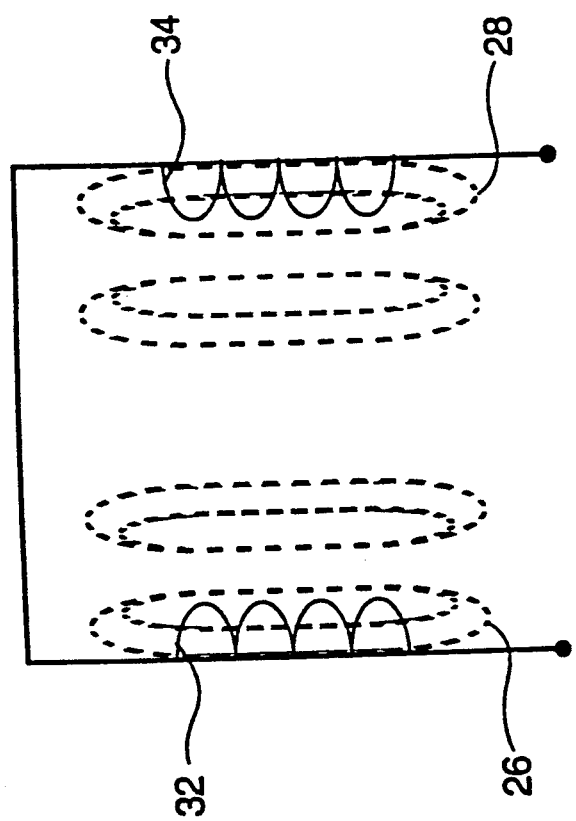
FIG. 3 is a diagram schematically illustrating the differential circuit relationship of the receiving coils of the apparatus in accordance with the preferred embodiment of the present invention.

The differential receiver two 32 and 34 are substantially polygonal and are electrically connected to one another in a differential circuit relationship such that the electrical signals induced within the coils by electromagnetic energy are subtracted from one another so as to form a differential output signal. A schematic illustration of the differential coils 32 and 34 is shown in FIG. 3.

Receiver coils 32 and 34 are disposed within the volume space of the transmitter at significantly separated points. Preferably, the receiver coils and the transmitter coil are coplanar and the receiver coils are disposed in diametrically opposite positions. Since the receiver coils are positioned within the volume space of the transmitter coil, both receiver coils share a linking relationship with the flux fields 26 and 28. It is preferable to have the receiver coils diametrically opposed so that there is assurance that the receiver coils will be linked with substantially identical portions of the flux field, so that when the output of the receiver coils are subtracted, the difference will be close to zero.

It is also desirable to separate the receiver coils by some significant distance so that both receiving coils will not receive equally intense transmissions from the transponder. Since the strength of the transponder field typically drops off at the rate of $1/d^5$, at the receiver coils, separating the receiver coils will help to assure that the energy of the transponder field is primarily only received by one receiver coil. Naturally, the differential receiver coils will work if disposed in positions that are not diametrically opposed, and therefore not separated by as large of a distance. Thus, as long as the receiver coils are not positioned adjacent to one another, there should be some significant difference in the energy received by each receiver coil from the transponder.

It should also be noted that because of the related positions of the receiver coils, both coils would also generally receive approximately equal levels of substantially uniform interference energy created by other nearby transmission sources. The positioning of the receiver coils 32 and 34 within the transmitter coil 20 is an important aspect of the present invention, in that it allows the presence of the substantially equal and opposite transmission fields, together with other substantially uniform magnetic fields, to be cancelled by the differential nature of the two coils. Hence, by differentially electrically connecting the receiver coils so as to subtract the output signals of the individual coils from one another, it is possible to produce a combined output signal which has a near zero voltage amplitude when the two coils receive approximately equal quantities of energy, and a maximum voltage amplitude when one of the coils receives more energy from an electromagnetic field than does the other receiver coil.

Alternatively, it may also be desirable in some instances to modify the range or area covered by the transmission and detection fields of the reader 14. Possible methods of doing this would be to modify the shape or physical configurations of the receiver coils, move the receiver coils away from the plane of the transmitter coil, or rotate the receiver coils by some angle, such that their central axes are no longer parallel to the Y-axis of the transmitter 20.

It is important to note, however, that when the receiver coils or the receiver coils position's are modified in any such manner, the electrical symmetry of the reader system must be maintained such that more of the energy of the transponder field can be intercepted by one receiver coil than the other receiver coil, or else the differential coils will not be able to accurately detect the presence of the transponder. It is also important to note that in the event that modifications cause the receiver coils to be linked with flux fields of different or variable intensities, the physical or electrical characteristics of the receiver coils can correspondingly be modified, such that even if the receiver coils are not symmetrical with respect to the energy received, the differential output signal can still be zero when both coils are exposed to substantially uniform fields.

Figure 2:
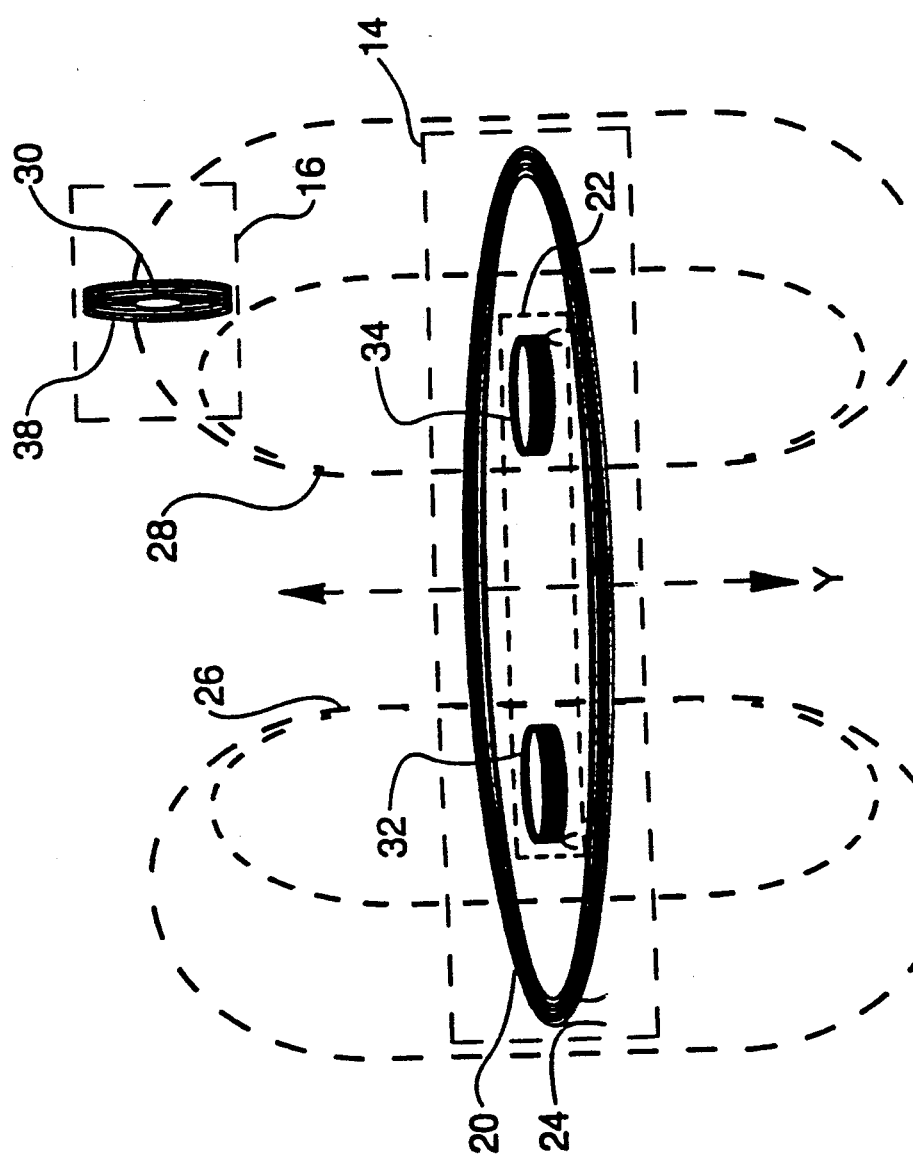
FIG. 2 is a partially-broken, perspective view of the transmission coil and receiving coils of the apparatus of FIG. 1 in accordance with the preferred embodiment of the present invention.

When the reader is configured as shown in FIG. 2, it is known that the reader 14 can accurately detect the presence of the transponder 30 at distances of up to at least 8 inches away. Once again, this increase in detection range over the prior art relates to the reader's ability to cancel out the relative presence of all but the transponder field when that field is primarily detected by only one receiver coil. The ability of the reader 14 to detect the transponder assembly 30 at such distances is also enhanced by the transponder assembly and modulation technique of the preferred embodiment of the present invention, as will be described below.

With reference to the particular arrangement of the various coils depicted in FIG. 1, the transponder 30 is positioned so as to receive the magnetic field generated by the transmitting coil 20. As previously stated, the strength of the electromagnetic field 38 retransmitted by the transponder is so small that it is effectively incapable of being detected by the transmitter coil. The transponder field 38 is, however, within the detectable range of the receiving coil 34. This is true because when the difference between the output of coil 32 is taken from the output of coil 34, the amplitude of the combined output signal will be greater than zero volts by an amount which corresponds to the energy transferred by field 38, thereby indicating the presence of the transponder and allowing for detection of the modulated identification signal contained within the field 38. In other words, the placement of the two receiver coils within the cylindrical volume of space of the transmission coil creates a high sensitivity to the transponder field and a low sensitivity to the transmitter field.

In order to be sensitive to the small transponder field, the receiver coils 32 and 34 should be formed from a sufficiently large number of turns of wire, i.e., 600 turns, so as to be sufficiently sensitive to the transponder field. The polygonal diameter of the two receiver coils should also each be smaller than the diameter of the transmitter coil, although this is not an absolute requirement if electrical symmetry is maintained. In the preferred embodiment, the receiver coils 32 and 34 are each approximately 20% of the diameter of the transmitter coil. Hence, when the diameter of the transmitter coil is 5-6 inches, the diameter of the receiver coils should be approximately $\frac{3}{4}$ to $1\frac{1}{4}$ inches.

Figure 4:
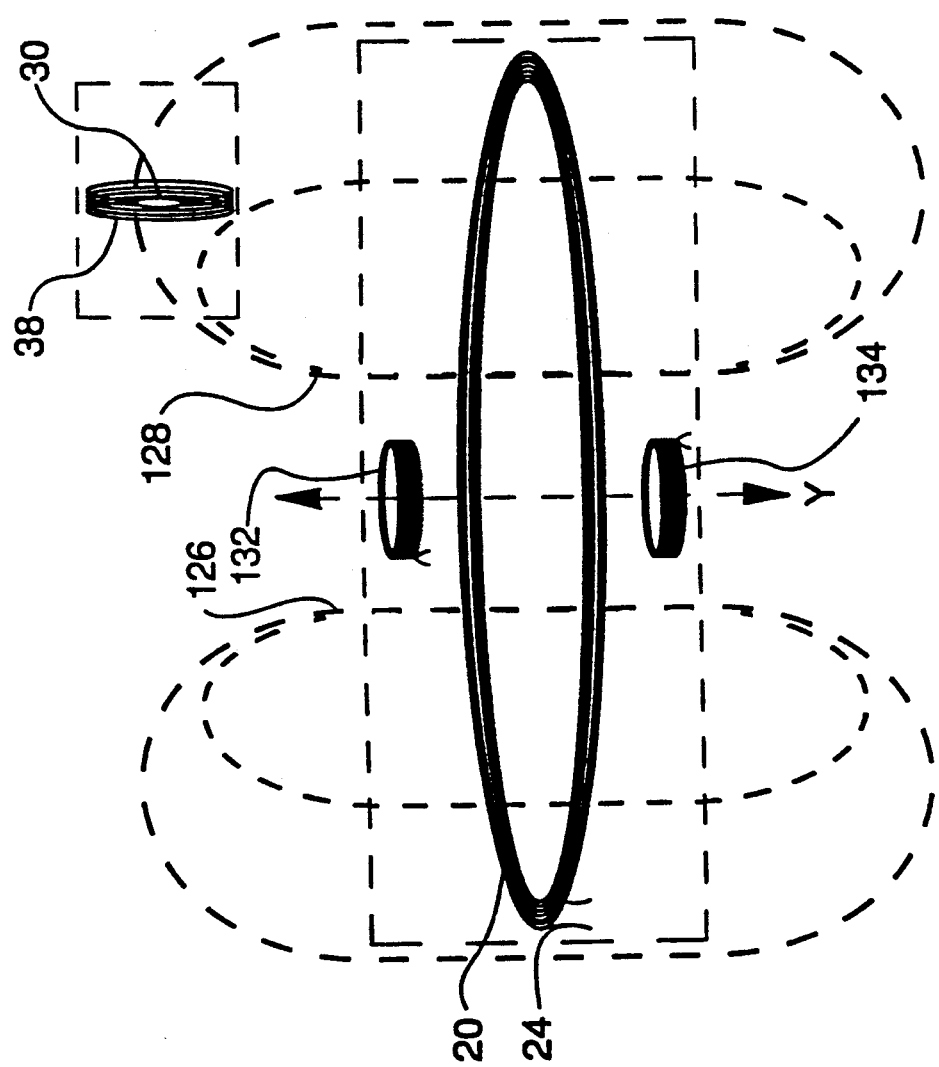
FIG. 4 is a partially-broken, perspective view of an alternative embodiment of the transmission coil and receiving coils of the present invention.
Figure 5:
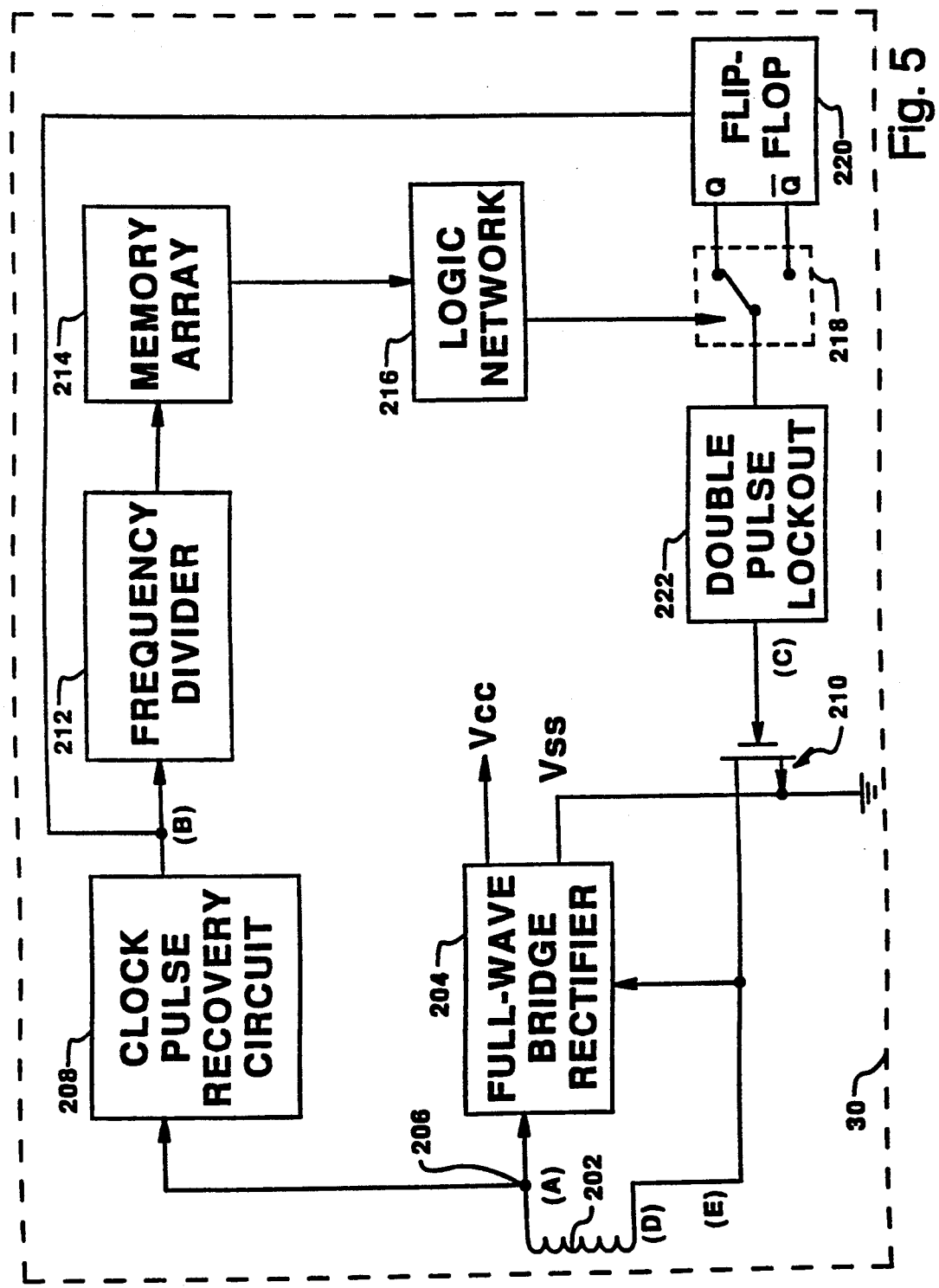
FIG. 5 is a diagram schematically illustrating a transponder assembly circuit in accordance with the preferred embodiment of the present invention.

An alternative embodiment of the present invention is depicted in FIG. 4, in which the two receiving coils 132 and 134 are more or less placed on top of one another, so as to be substantially, coaxially positioned along the central axis of the transmitting coil 20. Since the transponder 30 can only be located on one side of the transmitting coil 20 at any one time, the energy of the transponder field 38 will generally only induce an electrical signal in one of the receiving coils and not the other. Because of the substantially symmetrical positioning of the receiving coils 132 and 134 about the transmitter coil 20, the receiving coils will link with substantially identical portions of the flux fields 126 and 128. Hence, the differential coil effect of the two receiving coils will allow the low intensity magnetic field of the transponder to be detected despite the presence of the high intensity transmitter fields.

It is anticipated that the two receiving coils of the present invention could also be shaped, disposed and oriented in a number of other shapes and positions within the volume space of the transmitter coil and achieve the differential detection effect described in reference to the preferred and alternative embodiments.

Although the differential receiving coils 32 and 34 of the present invention can extend the range over which the transponder assembly's signals can be detected, this range can be further extended, or at least maintained, if the strength of the transponder field 38 is increased. Since it is desirable to increase the strength of the transponder signal without increasing the size or complexity of the transponder assembly, various means, which are unknown in the prior art, must be developed to derive such power. One such means can be demonstrated with reference now to FIG. 5, which schematically illustrates a transponder assembly circuit 30 in accordance with the preferred embodiment of the present invention.

The transponder 30 is primarily comprised of two parts, a coil 202 and an integrated circuit containing the electronic components that make up the remainder of the transponder. When the transponder 30 is brought within range of the interrogator 14, a current is induced to flow through the turns of the coil 202, thereby creating an AC voltage across the turns of the coil. This AC voltage is then input to and rectified by the full-wave bridge rectifier 204, the operation of which will be further explained with reference to FIG. 9, to produce the positive DC voltage $V_{cc}$ and the reference voltage $V_{ss}$.

Node 206 denotes the reference point at the "clock side" of the bridge. This node also allows this same AC voltage to be split-off and used as an input to the clock recovery circuit 208. The other side of the bridge is referred to as the "FET side" because of the presence of the N-channel FET 210, the function of which will be further explained below. The clock recovery circuit 208 generates rectangular clock pulses from the sinusoidal waveform of the AC voltage input for driving the remainder of the circuit.

A frequency divider 212, comprised of a chain of toggle flip-flops configured as a ripple counter, divides the output of the recovery circuit by eight. Since the preferred carrier frequency of the transmitting field is 134 KHz, and the preferred subcarrier frequency is 67 KHz, as will be further explained below, dividing the clock pulses by 8 causes the memory array 214 and the logic network 216 to serially clock out a new data bit every 16 cycles of the carrier frequency. This in turn corresponds to a possible phase shift every 8 cycles of the 67 KHz subcarrier. Hence, the bit period of the subcarrier is eight 67 KHz cycles long, or 119 microseconds, which results in a data transmission rate of 8375 bits per second.

The memory array 214 contains 64 bits of data (although larger arrays are also possible) which are used to identify the particular transponder in which the memory array is installed. The data bits output by the 64 bit memory array 214 are fed to the logic network 216, which toggles the position of the phase select switch 218 in relation to the flip-flop 220 whenever a logic "0" is shifted out of the memory array 214. The flip-flop 220, driven by the clock pulses output by the clock recovery circuit 208 generates Q and Q-bar signals, alternating at a 67 kHz frequency, which will be respectively selected by the data bits output from the logic network 216. When the phase select switch 218 is moved from Q to Q-bar by the logic network, one 67 KHz pulse is skipped, causing a 180 degree phase shift in the gate drive signal of the FET 210. Conversely, when the phase select switch 218 is moved, from Q-bar to Q, a pulse is added to the gate drive signal as the phase of the gate drive is shifted in the opposite direction.

The N-channel FET 210 is operative to periodically short out one leg of the bridge in accordance with the phase of the 67 KHz gate drive signal in order to modulate the field surrounding the transponder coil 202 with the desired information. Adding a pulse to the gate drive signal would thereby cause the FET 210 to short out the bridge leg two 134 KHz cycles in a row. Because power to the transponder circuitry is obtained from the coil 202, and shorting out the bridge leg prevents the transponder from receiving power over the period of the short, allowing the FET 210 to short out the bridge leg for two cycles in a row would cause the transponder's power to drop below acceptable levels. To avoid shorting out the bridge leg for an extended period of time, a double pulse lockout circuit 222 is added to remove this extra pulse from the gate drive signal input to the FET 210. Hence, this extra pulse is swallowed by the pulse lockout circuit 222 and will not be present in the actual waveform input to the FET 210. Although pulse lockout circuits are used in many different types of technology, the use of such a circuit in the preferred embodiment is an important feature of the present invention because it allows a single coil to be used to both power the circuit and transmit its output, thereby eliminating the need for separate coils as taught by the prior art.

An additional distinguishing feature of the present invention is the manner in which the subcarrier signal is phase modulated by the digital data stored in the memory array 214. It is important to note that the phase of the 67 KHz subcarrier changes when a logic "0" is transmitted, but does not change when a logic "1" is transmitted. When a logic "0" is assigned to one phase and a logic "1" is assigned to the other phase, such as is taught by the prior art, a missing bit or phase change, i.e., resulting from a realignment in the orientation of the transponder and interrogator, can cause a misinterpretation of the data being transmitted. The phase modulation technique of the present invention prevents the erroneous interchange of logic "1's" and "0's" which can occur in prior art systems because the present invention only watches for chances in the absolute phase of the subcarrier and not the absolute phase as taught in the prior art. Hence, the absolute phase of the received signal can vary as the interrogator moves relative to the transponder and not effect the system's ability to accurately read the transponder's identification data. This modulation technique will be further explained below with reference to FIGS. 7 and 8.

A further additional feature of the present invention relates to the frequency at which the subcarrier is modulated. As described with reference to the prior art, such devices typically modulate the subcarrier at one-tenth of the carrier frequency to make it easier for the interrogator to distinguish between the transmitted and received signals. Assuming the use of a 134 KHz carrier frequency in a prior art system, the main spectral components of that signal would appear at 13.4 Khz. Hence, the energy carrying lower and upper side bands of the carrier signal would be calculated as 120.6 KHz (134−13.4) and 147.4 KHz (134+13.4), respectively. Although modulating the subcarrier at this frequency simplifies receiver design by separating the subcarrier from the interfering exciter signal by a wider frequency spread, the energy dumped into both the 120.6 KHz and 147.4 KHz sidebands is now wasted energy because the receiver coil is not tuned to listen at these frequencies as well as the subcarrier frequency. In addition, a 13.4 KHz subcarrier signal cannot be modulated at the data rates available with higher frequency subcarriers. Since the data rate is an important factor in determining the code reading time, the data rate available is an important consideration, especially with respect to interrogating a moving transponder.

In the present invention, the subcarrier is modulated at one-half of the carrier frequency. The modulation of the coil current at 67 KHz produces three main spectral components, the subcarrier at 67 KHz and the upper and lower sidebands around the 134 KHz carrier signal. The upper sideband is at 201 KHz (134+67) and is wasted energy, but the lower sideband is at 67 KHz, which falls directly on top of the 67 KHz component of the coil current, thereby reinforcing and increasing the strength of the transmitted signal at 67 KHz. Since a stronger transponder signal directly relates to a greater reading distance, this increase in strength is extremely important. In addition, this subcarrier frequency allows for a high data transmission rate, thereby allowing the data to be read from the transponder numerous times before the transponder could possibly move a significant distance away from the interrogator.

Figure 6:
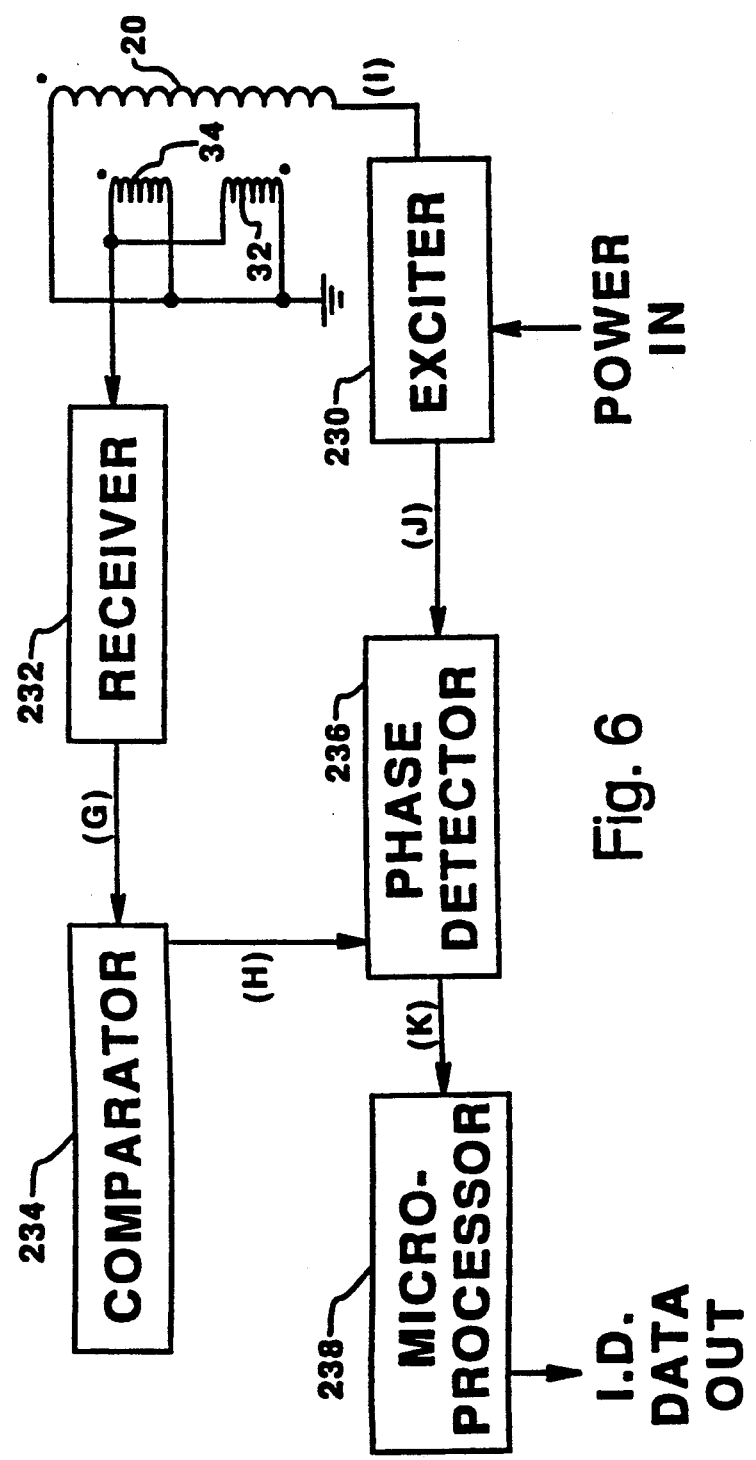
FIG. 6 is a diagram schematically illustrating an interrogator/receiver circuit in accordance with the preferred embodiment of the present invention.

FIG. 6 schematically illustrates an interrogator/receiver circuit in accordance with the preferred embodiment of the present invention. An exciter 230 drives the transmitting coil 20 with the 134 KHz carrier signal described above. The differential receiver coils 32 and 34 collect the modulated 67 KHz subcarrier signal emitted by the transponder 30 such that the large 134 KHz transmitting signal does not disturb the sensitivity of the receiver 232. The receiver circuit 232 is comprised of various stages, such as bandpass and notch filters, low-noise amplifiers and limiters, which operate to recover the phase modulated 67 KHz subcarrier collected by the receiver coils. The recovered signal is then applied to a comparator circuit 234 which "squares up" the sinusoidal receiver output by means of zero-crossing detection. This signal is then applied to the phase detector 236. The phase detector 236 is a flip-flop which receives a trigger from the exciter 230. Because the received signal from the comparator 234 is synchronous with, but not necessarily in phase with, the 134 KHz transmitting current, it is possible to easily trigger the phase detector so as to recover the changes in phase of the received signals. These phase changes are then logged by the microprocessor 238 which extracts the correct identification code of the transponder and outputs an identification data signal for storage or display as appropriate.

Figure 7:
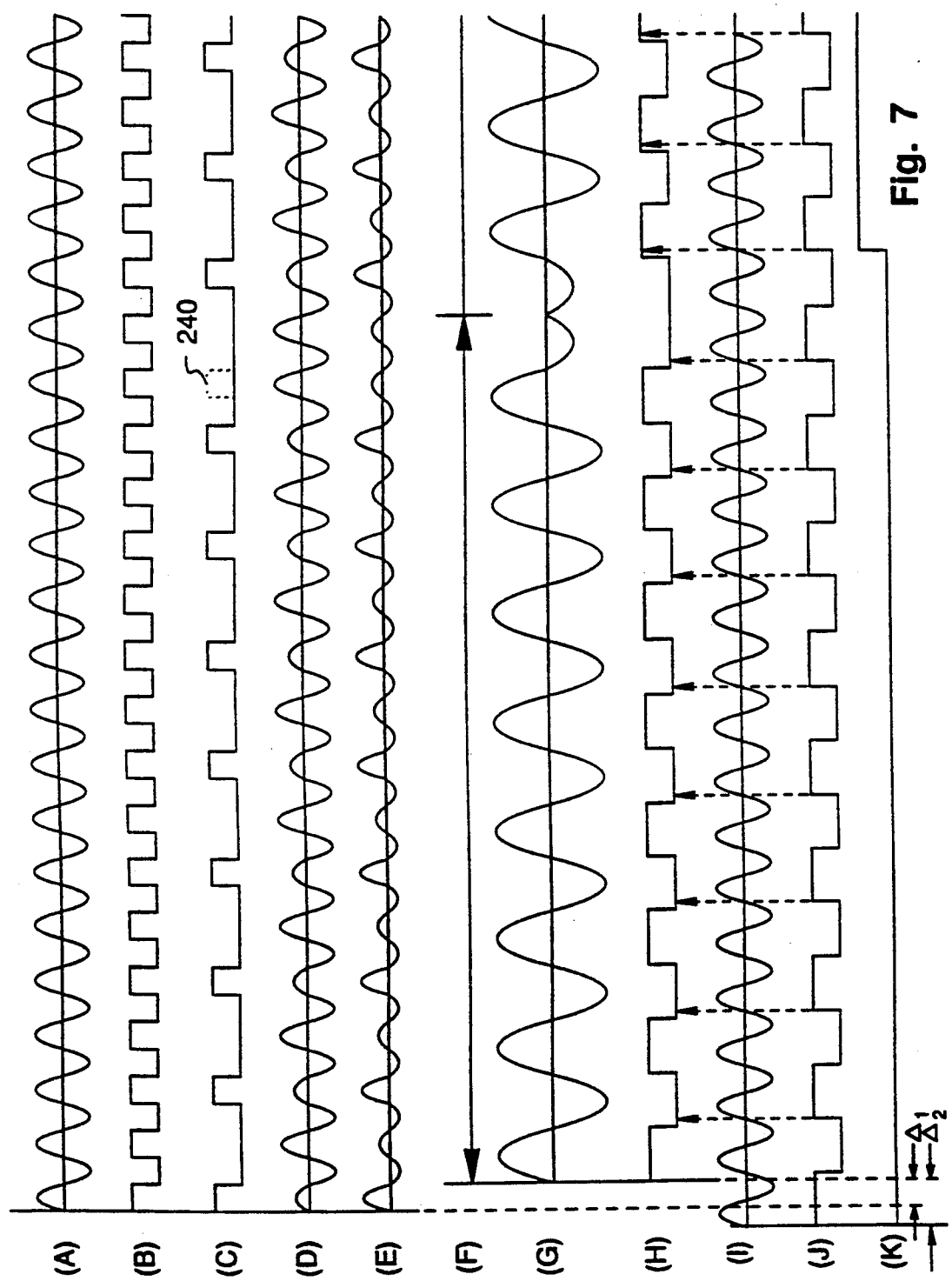
FIG. 7 is a timing diagram illustrating the relationship between the modulation waveforms present at various locations in the transponder and at, various locations in the interrogator/receiver.
Figure 8:
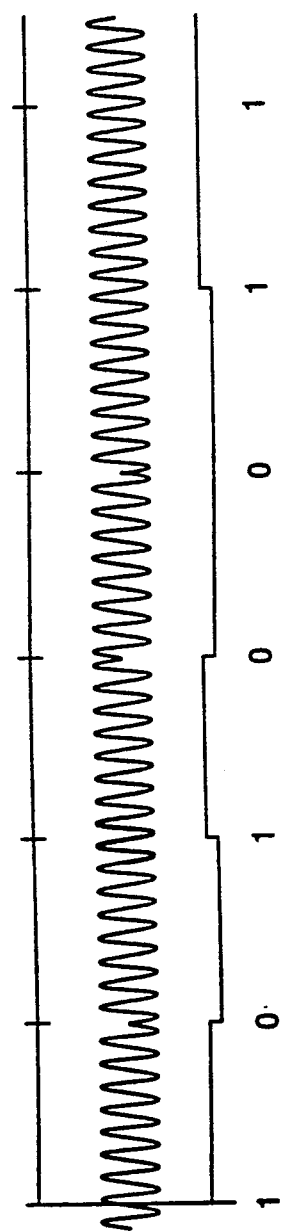
FIG. 8 is a timing diagram illustrating a typical bit sequence of a bit stream modulated in accordance with the preferred embodiment of the present invention.

As stated above, the modulation technique and operation of the circuitry of the present invention can be better understood with reference to FIGS. 7 and 8. FIG. 7 is a timing diagram illustrating the relationship between the modulation waveforms present at various locations in the transponder and those present at various locations in the interrogator/receiver. Traces (A) through (K) illustrate the transmission of one phase shift, or the encoding of a logic "0". The transmission of a logic "1" is not illustrated because a logic "1" is transmitted only when no phase shift occurs over two bit periods, hence, the same repetitious waveforms would be illustrated for two whole bit periods in order to illustrate the transmission of a logic "1".

Traces (A) through (E) illustrate the transponder's operation and are in-phase with respect to one another. Traces (F) through (H) illustrate the operation of the interrogator/receiver. Although traces (F) through (H) are in-phase with respect to one another, they will most likely not be in-phase with respect to traces (A) through (E) because the different orientations of the transponder and receiver coils change the relative phases of the two groups of signals. Likewise, traces (I) through (K), which illustrate the operation of the phase detector 236, are in-phase with respect to one another but have a shifting phase with respect to traces (F) through (H).

Trace (A) is the 134 KHz carrier signal which appears on the "clock side" of the bridge rectifier 204 as measured at node 206. Trace (B) is the recovered clock signal output by the clock pulse recovery circuit 208. Trace (C) is the gate drive signal output from the double pulse lockout 222. When this signal is high, normally every other clock pulse in accordance with the modulation of the 67 KHz subcarrier, the FET 210 shorts out the "FET side" of the rectifier bridge as described above. However, as will be recalled, certain phase changes can result in the addition of an extra high pulse in the gate drive signal, which can undesirably short out the coil 202 for two 134 KHz cycles in a row. Trace (C) shows how this additional pulse 240 (shown by the dotted lines) would appear in the gate drive signal if it were not for its removal by the double pulse lockout 222.

Trace (D) is the voltage signal which appears across the transponder coil 202. The chopped pulses of the sinusoid are a result of the FET 210 being turned on by the gate drive signal to short out one leg of the bridge rectifier 204. An inspection of the bridge circuit depicted in FIG. 9 will reveal the modulation technique utilized to modulate the sinusoid. When the gate drive signal skips a regular pulse, as a result of the phase select switch 218 and the pulse lockout 222, the trace (D) stays high two pulses in a row. Trace (E) is the current through the transponder coil 202. The larger current peaks are a result of the coil 202 being shorted by the FET 210, which corresponds to the variations in the voltage signal of trace (D).

Trace (F) is the bit period in relation to the signals received by the receiver coils 32 and 34 from the transponder 30. Trace (G) is the analog output of the receiver circuit 232. Trace (H) is the output of the comparator 234 after it has "squared up" the receiver output. Note that due to the difference in orientation of the receiver/interrogator and the transponder 30, the traces representing the signals within the receiver/interrogator are displaced by a distance Delta-one with respect to the phase of the traces representing the signals within the transponder 30.

Likewise, trace (I), which is the transmitter output of the exciter 230, has the same frequency as the signal represented by trace (A), but would not normally be in phase with trace (A) because of the difference in the orientation of the system. For example, as shown in FIG. 7, traces (I) through (K) are shown to be displaced from traces (F) through (H) by a distance Delta-two, wherein Delta-two is larger than Delta-one. Trace (J) is the synchronous output of the exciter 230 which is used to trigger the phase detector 236. As will be noted, the rising edge of the trace (J) corresponds with the zero-crossing of the trace (I) and clocks trace (H) into the phase detector 236. The rising edge of trace (J) is free to move in time anywhere along the line denoting the low pulse of the trace (H) and no phase change will occur until a desired phase change is instigated. After the desired phase change, the rising edge of trace (J) would be free to move in time anywhere along the line denoting the high pulse of the trace (H) without changing phase until the next phase change.

This mobility in phase alignment is a distinct advantage of the present invention because it allows for variations in the phase relationship between the sync pulse and the comparator output without resulting in an undesired phase change. Although a phase change may occur in some situations, since the microprocessor 238 is designed to only look for phase changes at specific times, such a change would generally not result in a misreading of the transponder's identification code. In addition, even if the phase change impacted the proper reading of the transponder's identification code, the data rate and bandwidth efficiency of the system are such that sufficient readings could be taken by the system before the transponder had a chance to move out of range. Finally, trace (K), which is the output of the phase detector flip-flop, indicates the absolute phase of the incoming 67 KHz subcarrier signal. The microprocessor examines this phase signal and assigns a zero to the decoded data output whenever the phase changes in a bit period.

FIG. 8 illustrates a timing diagram for a typical bit sequence of a bit stream modulated in accordance with the above description, and in particular, to the description of FIG. 7. As shown the initial bit period is high, but the second bit period switches to low at the first phase change. Because the phase does not change at the start of the third bit period, the third bit period is high. A new phase change causes the fourth bit period to go low and a subsequent phase change causes the fifth bit period to stay low. Hence, it can be seen that through the bit stream "1 0 1 0 0 1 1", a change in phase of the signal at the fall of the eighth cycle always results in a logic "0" while no change results in a logic "1".

Figure 9:
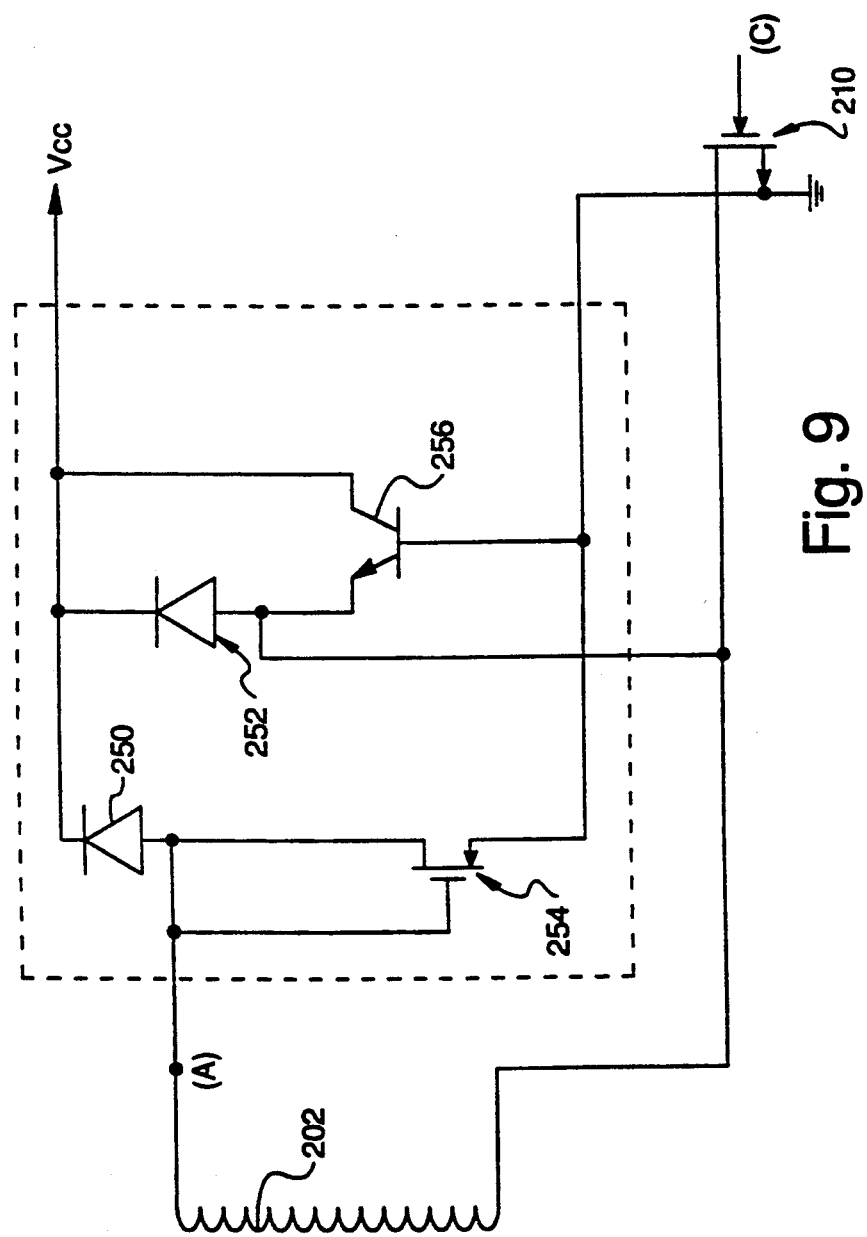
FIG. 9 is a diagram schematically illustrating the full-wave bridge rectifier of FIG. 5.

With reference now to FIG. 9, the full-wave bridge rectifier 204 is shown in greater detail. The positive swings of the AC voltage input to the rectifier 204 from the coil 202 is clamped by the diodes 250 and 252 to $V_{cc}$. The P-channel FET 254 clamps the negative swings of one side of the coil 202 to the threshold voltage of the P-channel FET 254 (about $-1.0$ volts), while the parasitic transistor 256, which is formed by the inherent construction technique of the integrated circuit, clamps the other side of the coil 202 to $-V_{be}$ (about $-0.6$ volts) on its negative swings. In this manner, the AC coil voltage is full-wave rectified and the resulting DC voltage is applied to the integrated circuit as $V_{cc}$.

It should be noted that since the distance between the transponder and the transmitting coil is not fixed, wide variations in the induced AC coil voltage are likely to occur. However, the bridge circuit 204 can reduce the variance which would otherwise appear in $V_{cc}$ with each change in the AC coil voltage. At large distances, transistor 256 merely acts as a diode to rectify the AC coil voltage, but as the transponder is moved closer to the transmitting coil and $V_{cc}$ would otherwise increase, transistor 256 turns on harder and draws substantial collector current, thereby reducing $V_{cc}$ by shunting the current to ground. It should also be noted that it is an advantage of the preferred embodiment of the present invention that with respect to the transistor 256, the use of a parasitic transistor, or any transistor for that matter, as a $V_{cc}$ shunt regulator allows the transponder to be placed right on top of the exciter coil without suffering malfunction or damage in the transponder's circuitry as a result of a large increase in operating power.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

We claim:

1. A method of generating an electromagnetic identifying signal in response to receipt of a transmitted electromagnetic interrogating signal alternating at a first frequency, comprising:

converting the received interrogating signal into a power signal and a modulating signal including a series of pulses occurring at a second frequency;

using said power signal to retrieve at a predetermined bit rate a stored identifying digitally coded signal comprised of a string of "1" bits of a first logic state and "0" bits of a second logic state;

using said digitally coded signal to shift the phase of a block of said modulating signal pulses when the state of a particular bit of said coded signal is of said first state, and to not shift the phase of a like block of said modulating signal pulses when the state of a bit is of said second state; and using the phase-shifted modulating signal to amplitude-modulate said interrogating signal and to cause the resulting electromagnetic identifying signal to be retransmitted in the form of a subcarrier signal the phase of which is shifted by 180° when a "1" bit is retransmitted and is not shifted when a "0" bit is retransmitted.

2. A method as recited in claim 1 wherein said first frequency is 134 kHz and said second frequency is 67 kHz.

3. A method as recited in claim 2 wherein said predetermined bit rate is 8.375 kHz.

4. A transponder for generating an electromagnetic identifying signal in response to receipt of a transmitted electromagnetic interrogating signal alternating at a first frequency, comprising:

first means for receiving and converting the received interrogating signal into a power signal, a clock signal, and a modulating signal including a series of pulses occurring at a second frequency equal to one half said first frequency;

data storage means for storing an identifying, digitally coded signal comprised of a string of "1" bits of a first logic state and "0" bits of a second logic state;

second means responsive to said power signal and said clock signal and operative to retrieve the stored digitally coded signal from said storage means and to output said digitally coded signal at a predetermined bit rate;

third means responsive to the retrieved digitally coded signal and operative to shift the phase of a block of said modulating signal pulses when the state of a particular bit of said coded signal is of said first logic state, and to not shift the phase of a like block of said modulating signal pulses when the state of another bit of said coded signal is of said second logic state; and fourth means responsive to the shifted and unshifted blocks of modulating signal pulses and operative to cause said first means to amplitude modulate the received interrogating signal and cause an electromagnetic identifying signal to be retransmitted in the form of a subcarrier signal at said second frequency the phase of which is shifted by 180° when a "1" bit is being retransmitted and the phase of which is not shifted when a "0" bit is being retransmitted.

5. A transponder as recited in claim 4 wherein said first means includes:
   coil means for receiving electromagnetic energy containing said interrogating signal and for developing electromagnetic energy containing said identifying signal;
   rectifier means coupled to said coil means for converting energy contained in said interrogating signal into said power signal; and
   clock recovery means coupled to said coil means and operative to convert energy contained in said interrogating signal into said clock signal and said modulating signal, the frequency of said clock signal being f/n, where f is the frequency of said interrogating signal and n is an integer greater than 2.

6. A transponder as recited in claim 5 wherein said rectifier means includes a shunt regulator for shunting excess current produced by said rectifier to circuit ground when the amplitude of said interrogating signal exceeds a predetermined limit whereby the voltage level of said power signal is maintained within a predetermined operating range.

7. A transponder as recited in claim 6 wherein said shunt regulator is formed by a parasitic transistor.

8. A transponder as recited in claim 5 wherein said rectifier means is formed by three junction diodes and a P-channel FET.

9. A transponder as recited in claim 8 wherein said shunt regulator is formed by a parasitic transistor associated with one of said junction diodes.

10. A transponder as recited in claim 4 wherein said fourth means includes a modulating switch responsive to the shifted and unshifted modulating signal pulses and operative to short said coil means for the duration of each said pulse.

11. A transponder as recited in claim 10 and further comprising double pulse lock-out means located in the signal path between said third means and said modulating switch, said lock-out means being responsive to said clock signal and said digitally coded signal and operative to prevent said modulating switch from being actuated during two successive pulses of said clock signal.

12. A transponder as recited in claim 11 wherein said modulating switch is an N-channel FET coupled across one of said junction diodes.

* * * * *